(12) United States Patent
Karpovsky et al.

(10) Patent No.: US 12,095,792 B2
(45) Date of Patent: Sep. 17, 2024

(54) MULTI-VARIATE ANOMALOUS ACCESS DETECTION

(71) Applicant: Microsoft Technology Licensing, LLC, Redmond, WA (US)

(72) Inventors: Andrey Karpovsky, Kiryat Motzkin (IL); Idan Yehoshua Hen, Rosh-Ha'ayin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 17/589,469

(22) Filed: Jan. 31, 2022

(65) Prior Publication Data

US 2023/0300156 A1 Sep. 21, 2023

(51) Int. Cl.
| | |
|---|---|
| *H04L 9/40* | (2022.01) |
| *G06F 18/21* | (2023.01) |
| *G06K 9/62* | (2022.01) |
| *G06N 20/00* | (2019.01) |

(52) U.S. Cl.
CPC ...... *H04L 63/1425* (2013.01); *G06F 18/2178* (2023.01); *G06N 20/00* (2019.01); *H04L 63/0236* (2013.01); *H04L 63/104* (2013.01); *H04L 63/1416* (2013.01); *H04L 63/1466* (2013.01)

(58) Field of Classification Search
CPC ............. H04L 63/1425; H04L 63/0236; H04L 63/104; H04L 63/1416; H04L 63/1466; G06N 20/00; G06F 18/2178
See application file for complete search history.

(56) References Cited

U.S. PATENT DOCUMENTS

| | | | | |
|---|---|---|---|---|
| 2017/0244737 | A1* | 8/2017 | Kuperman | G06N 3/084 |
| 2017/0279830 | A1* | 9/2017 | Mermoud | A61M 15/009 |
| 2018/0247220 | A1* | 8/2018 | Assem Aly Salama | G06N 20/00 |
| 2018/0288063 | A1* | 10/2018 | Koottayi | G06F 21/50 |
| 2020/0280573 | A1* | 9/2020 | Johnson | G06F 21/316 |
| 2020/0351283 | A1* | 11/2020 | Salunke | H04L 63/1425 |
| 2021/0152555 | A1* | 5/2021 | Djosic | H04L 63/10 |
| 2021/0234877 | A1* | 7/2021 | Prabhu | H04L 63/102 |
| 2022/0172037 | A1* | 6/2022 | Kang | G06N 3/044 |

OTHER PUBLICATIONS

"International Search Report and Written Opinion Issued in PCT Application No. PCT/US2023/010254", Mailed Date: Apr. 18, 2023, 12 Pages. (MS# 410885-WO-PCT).

* cited by examiner

*Primary Examiner* — Darshan I Dhruv (74) *Attorney, Agent, or Firm* — Workman Nydegger (57) ABSTRACT

Multiple variate anomaly detection against multiple scopes of the requested resource. Even if one of the variates patterns is sensitive to physical location of the requestor and/or the resource, not all of the variates of the access pattern will be. Furthermore, even if one of the scopes of the resource is sensitive to physical location of the resource, not all scopes will be. Thus, the use of multiple variates of the access pattern and multiple scopes of the anomaly detection allows for better estimates of anomaly detection to be made, even when the source of the access request is virtualized and/or the location of the resource is virtualized.

20 Claims, 7 Drawing Sheets

MULTI-VARIATE ANOMALOUS ACCESS DETECTION

BACKGROUND

Modern computing technology relies on secure access to computing resources maintained by other computing systems (such as databases). A common security feature that helps to provide such secure access is intrusion detection. The goal of intrusion detection is to alert security teams of potential breaches, compromises or vulnerabilities in an efficient manner; in particular by providing timely, accurate, concise and descriptive alerts.

In order to maintain credibility, intrusion detection should be highly accurate, both in terms of precision and recall. Recall accuracy refers to the proportion of actual malicious events that are detected. Low recall accuracy means that there are too many intrusions that are not detected, causing the intrusion detection to lose credibility. Precision accuracy refers to the proportion of raised alerts that are related to actual malicious events. Low precision accuracy means that there are too many false positives, leading to alert fatigue.

Often, an alert is a combination of a probabilistic anomaly and a security scenario. The probabilistic anomaly is an event that is rare and significantly different from common events. This combination means the event or chain of events are related to a known attack description. A problem with this approach is data skew—meaning that an absolute majority of activity is legitimate, even when rare. For example, events like a developer performing monthly backup of server data are very hard to differentiate from a hacker dumping server data to the hacker's storage. Labels for legitimate versus malicious are mostly nonexistent, forcing detection algorithms to work in non-supervised machine learning mode.

An "access anomaly" is a common type of alert that is raised when a new or unexpected entity (for example a source IP or location) accesses a resource. This access is usually legitimate (such as a legitimate user connecting from a new location), but could indicate malicious usage. For this reason, an alert is commonly raised when the source of access (IP mapped to location) is unexpected and new. This could be done based on various statistical and machine learning approaches. For example, probabilistic (estimating the probability of seeing a new entity), graph based (connections between entity and resource) and other approaches can be utilized.

In the physical domain, an "impossible travel" model is commonly used—such as when the physical device requesting access changes its physical location at improbable speed. Thus, when a user's physical device requests access from an IP address mapped to the United States, and five minutes later the user's device requests access from an IP address mapped to Europe, the impossible travel model would likely flag the second access request as anomalous.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In the cloud, the impossible travel model does not apply because both the source and target of the access could be virtual (such as a connection from a virtual machine to cloud storage over a virtual network or "VNET"). Accordingly, differentiating between malicious and legitimate accesses is challenging, since both the source IP address and target IP address may each not be stably or exactly related to a particular location. As an example, to ensure high availability of a target resource, some cloud-based services may replicate potential targets across geographically dispersed locations. Such replication is typically not visible to the user of the cloud-based service. Rather, the user simply experiences high availability of the resources and does not mind or care how that high availability is achieved. Since the replication activity is dynamic and does not appear in the logs used by an intrusion detection service, this makes accurate detection of anomalous access patterns even more challenging.

In accordance with the principles described herein, multiple variates of the access pattern and multiple scopes of the resource are used to perform anomaly detection. Even if one of the access pattern variates is sensitive to physical location of the requestor and/or the resource, not all of the variates of the access pattern will be. Furthermore, even if one of the scopes of the resource is sensitive to physical location of the resource, not all scopes will be. Thus, the use of multiple variates of the access pattern and multiple scopes of the anomaly detection allows for better estimates of anomaly detection to be made, even when the source of the access request is virtualized and/or the location of the resource is virtualized.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In the cloud, the impossible travel model does not apply because both the source and target of the access could be virtual (such as a connection from a virtual machine to cloud storage over a virtual network or "VNET"). Accordingly, differentiating between malicious and legitimate accesses is challenging, since both the source IP address and target IP address may each not be stably or exactly related to a particular location. As an example, to ensure high availability of a target resource, some cloud-based services may replicate potential targets across geographically dispersed locations. Such replication is typically not visible to the user of the cloud-based service. Rather, the user simply experiences high availability of the resources and does not mind or care how that high availability is achieved. Since the replication activity is dynamic and does not appear in the logs used by an intrusion detection service, this makes accurate detection of anomalous access patterns even more challenging.

In accordance with the principles described herein, multiple variates of the access pattern and multiple scopes of the resource are used to perform anomaly detection. Even if one of the access pattern variates is sensitive to physical location of the requestor and/or the resource, not all of the variates of the access pattern will be. Furthermore, even if one of the scopes of the resource is sensitive to physical location of the resource, not all scopes will be. Thus, the use of multiple variates of the access pattern and multiple scopes of the anomaly detection allows for better estimates of anomaly detection to be made, even when the source of the access request is virtualized and/or the location of the resource is virtualized, such as can be the case in a cloud computing environment.

Figure 1:
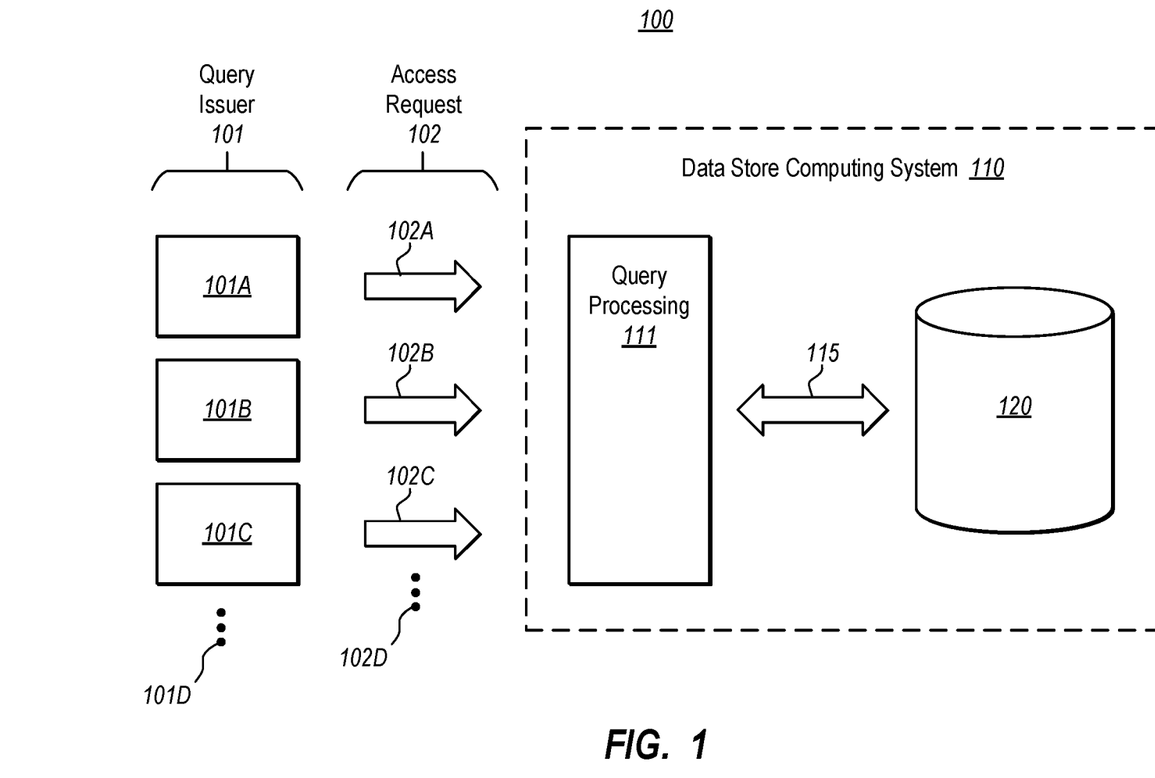
FIG. 1 illustrates an environment in which the principles described herein may be employed, and which includes a data store computing system that processes access requests to be executed against a data store.

FIG. 1 illustrates an environment 100 in which the principles described herein may be employed. The environment 100 includes a data store computing system 110 that processes access requests to be executed against a data store. In particular, the data store computing system 110 includes a query processing component 111 that receives access requests to be processed against a data store 120. The interaction between the query processing component 111 and the data store 120 is represented in FIG. 1 by a bi-directional arrow 115.

As an example, the data store may be a cloud-based data service, a database, a combination of a cloud-based data service and a database, or any other data store. As an example, the data store computing system 110 may be structured as described below for the computing system 700 of FIG. 7. The query processing component 111 may be structured as described below for the executable component 706 of FIG. 7. Query processing components that receive and interpret access requests for a data store are often termed a "query engine".

The data store computing system 110 may receive access requests from any of multiple possible query issuers 101. In the illustrated case, the query issuers 101 include three possible query issuers 101A, 101B and 101C. However, the ellipsis 101D represents that the data store computing system 110 (and thus the query processing component 111) may receive access requests from any number of query issuers. In some cases, there may be innumerable numbers of possible query issuers that may issue access requests targeted to the data store 120 that are received by the query processing component 110.

As an example, in the illustrated case, the query issuer 101A sends an access request 102A to the query processing component 111 of the data store computing system 110. Likewise, the query issuer 101B sends the access request 102B and the query issuer 101C sends the access request 101C to the data store computing system 110 for processing by the query processing component 111. The access requests 102A through 102D may be collectively referred to hereinafter as "access requests 102". As represented by the ellipsis 102D, other query issuers (as represented by the ellipsis 101D) may also issue access requests to the data store computing system 110. The ellipsis 102D also represents that any of the query issuers may issue any number of access requests to the data store computing system 110.

Each access request includes instructions to perform operations on the data store 120. As an example, an access request may include instructions to read data, edit data, delete data, and so forth. In some query languages, the access request is structured as a string of characters. The access request is typically further structured to conform with syntactic rules of a query language. An example query language is the Structured Query Language (SQL). Other query languages include, but are not limited to, Hyper Text Structured Query Language (HTSQL) language, the Muldis Data (Muldis D) language and Multidimensional Expressions (MDX) language, amongst others. The principles described herein are not limited to any particular query language.

Figure 2:
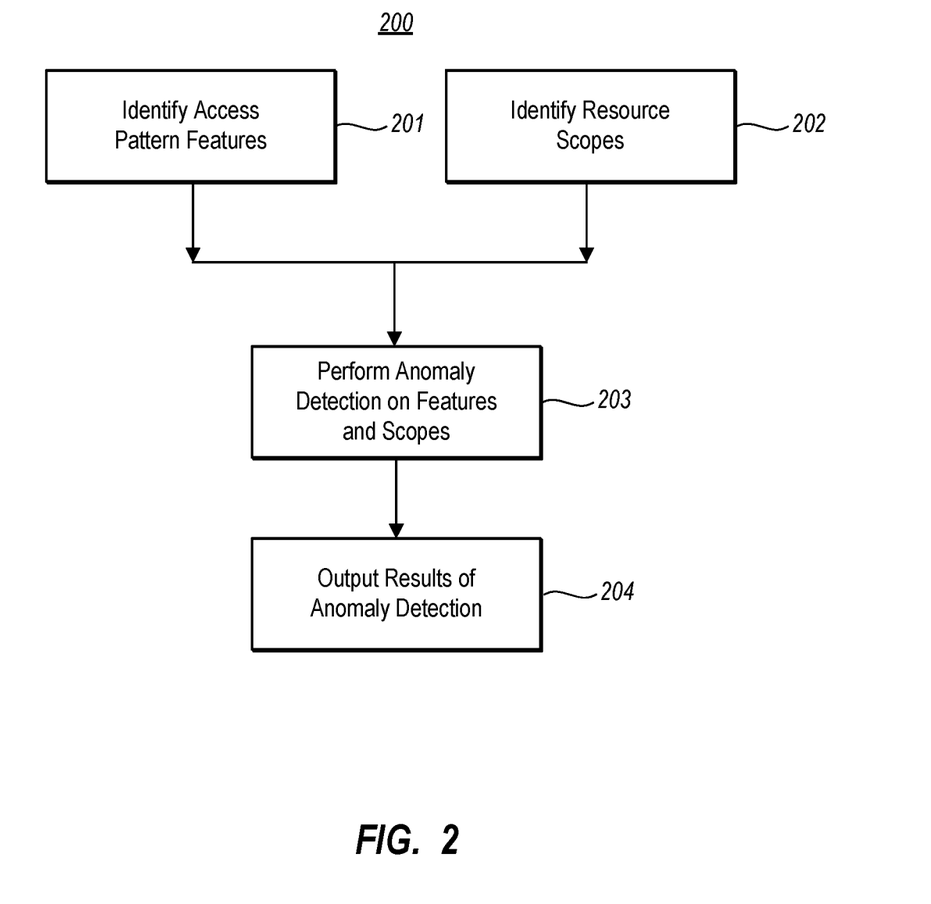
FIG. 2 illustrates a flowchart of a method for detecting information relevant to a potential access anomaly of an access request, in accordance with the principles described herein.

FIG. 2 illustrates a flowchart of a method 200 for detecting information relevant to a potential access anomaly of an access request, in accordance with the principles described herein. The method 200 may be performed by the query processing component 111 with respect to any of the access requests 102 of FIG. 2. The method 200 includes identifying a plurality of features of an access pattern of the access request (act 201) and identifying a plurality of scopes of a resource requested to be accessed by the access request (act 202). These acts 201 and 202 are illustrated in parallel in FIG. 2 to emphasize that these identifications do not have any logical dependency on each other. One can be performed before or after the other or at the same time, without restriction. After the identification of the access pattern features (act 201) and the resource scopes (act 202), anomaly detection is performed on at least some of the plurality of features of the access pattern against at least some of the plurality of scopes of the resource (act 203). The result of the anomaly detection is then output (act 204).

Figure 3:
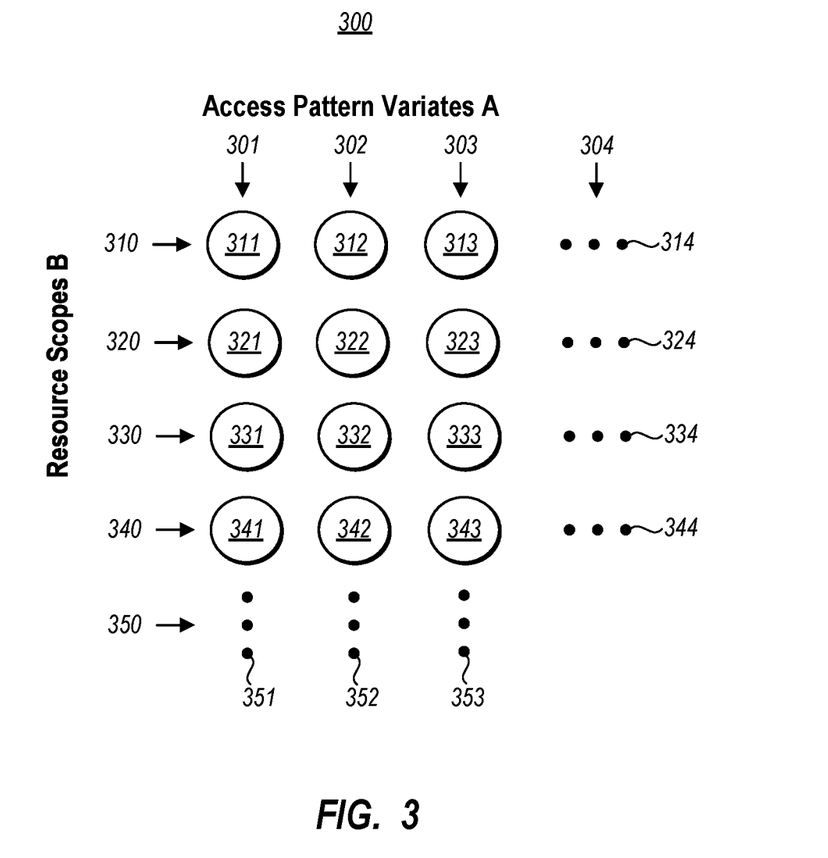
FIG. 3 illustrates an example grid of combinations of access pattern features (or "variates") and resource scopes.

FIG. 3 illustrates an example grid 300 of combinations of access pattern features (or "variates") A and resource scopes B. In this example, there are three illustrated access pattern features 301, 302 and 303. However, the ellipses 304 represent that the principles described herein apply for any plural number of access pattern features. Also, in this example, there are four illustrated resource scopes 310, 320, 330 and 340. However, the ellipses 350 represent that the principles described herein apply for any plural number of resource scopes.

As specific examples only, an access pattern feature may be a source Internet Protocol address of the access request, a geographical location of a source of the access request, a username associated with the access request, a requesting application associated with the access request, a security credential associated with the access request, or any other feature of the access pattern of the access request. As specific examples only, a resource scope may be an individual resource, a resource group to which the individual resource belongs, a subscription to which the resource group belongs, an organization to which the subscription belongs, or any other scope of the resource. Accordingly, the principles described herein may be used to perform anomaly detection with respect to any plural number of access pattern features and any plural number of resource scopes to provide good insight into whether an actual access anomaly is occurring, even for complex environments such as cloud computing environments.

Referring again to FIG. 3, each circle represents a combination of a specific access pattern feature and a specific resource scope. As an example, for the resource scope 310, the combination 311 is of the access pattern feature 301 and the resource scope 310, the combination 312 is of the access pattern feature 302 and the resource scope 310, the combination 313 is of the access pattern feature 303 and the resource scope 310, with the ellipsis 314 representing that there may be other combinations of other access pattern features and the resource scope 310. Similarly, the combinations 321, 322 and 323 are of the respective access pattern features 301, 302 and 303 and the resource scope 320, with the ellipsis 324 representing that there may be other combinations of other access pattern features and the resource scope 320. The combinations 331, 332 and 333 are of the respective access pattern features 301, 302 and 303 and the resource scope 330, with the ellipsis 334 representing that there may be other combinations of other access pattern features and the resource scope 330. The combinations 341, 342 and 343 are of the respective access pattern features 301, 302 and 303 and the resource scope 340, with the ellipsis 344 representing that there may be other combinations of other access pattern features and the resource scope 340.

Scanning in the perpendicular direction, for the access pattern feature 301, the combinations 311, 321, 331 and 341 are of the respective resource scopes 310, 320, 330 and 340 and the access pattern feature 301, with the ellipsis 351 representing that there may be other combinations of resource scopes and the access pattern feature 301. For the access pattern feature 302, the combinations 312, 322, 332 and 342 are of the respective resource scopes 310, 320, 330 and 340 and the access pattern feature 302, with the ellipsis 352 representing that there may be other combinations of resource scopes and the access pattern feature 302. For the access pattern feature 303, the combinations 313, 323, 333 and 343 are of the respective resource scopes 310, 320, 330 and 340 and the access pattern feature 303, with the ellipsis 353 representing that there may be other combinations of resource scopes and the access pattern feature 303.

In one embodiment, the performing of the anomaly detection of at least some of the plurality of features of the access pattern against at least some of the plurality of scopes of the resource comprises using a machine learning model that is dedicated to each corresponding access pattern feature and resource scope. Thus, to generate an anomaly detection for the combination 311, a machine learning model is fed the value of the access pattern feature 301 of the access request and the value of the resource scope 310 of the requested resource. Similarly, to generate an anomaly detection for the combination 312, a different machine learning model is fed the value of the access pattern feature 302 and the value of the resource scope 310 of the requested resource. Thus, in the case of FIG. 3, twelve machine learning models may be used corresponding to each circled combination to generate twelve different anomaly detection estimates.

These anomaly detection estimates may be provided to a security analyst who may evaluate this rich set of information to determine if the access request truly is anomalous. This presentation may be using a user interface that is intuitive to a human user. For example, suppose that anomaly detection for each combination is rated on a scale of 0 to 4, that there are three access pattern features, and four resource scopes. For each resource scope, the results may be presented as a cube, where each dimension of the cube represents one of the three access pattern features, and where the combined anomaly detection scope may be presented as a point within the respective cube.

Figure 4:
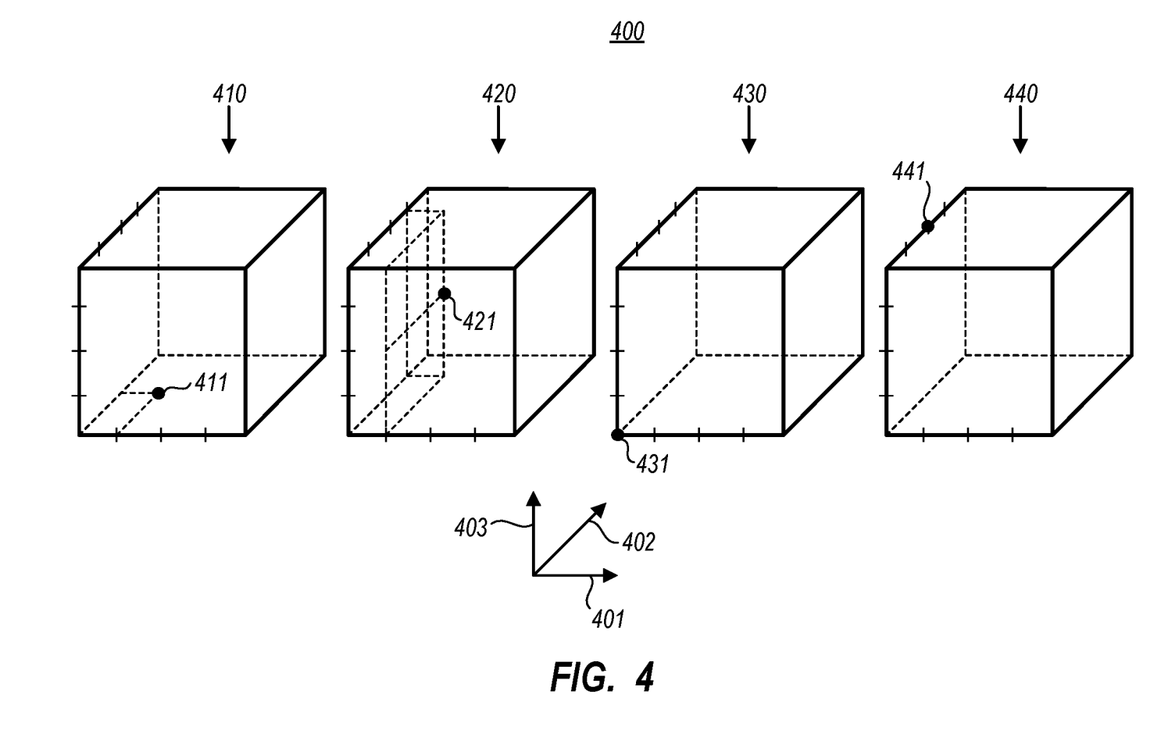
FIG. 4 illustrates an example user interface in which anomaly detection results may be displayed to a user, in the form of four cubes each associated with respective resource scopes, each having three dimensions associated with respective access pattern features.

For instance, FIG. 4 illustrates an example user interface 400 that includes four cubes 410, 420, 430 and 440, each associated with respective resource scopes (e.g., resource scopes 310, 320, 330 and 340 of FIG. 3). The dimensions 401, 402 and 403 may each be associated with a respective access pattern feature (e.g., access pattern features 301, 302 and 303 of FIG. 3).

Cube 410 shows a point 411 at position (1, 2, 0) representing that there was a slight anomaly suspected when evaluating the combination of the access pattern feature 301 and the resource scope 310, a moderate anomaly suspected when evaluating the combination of the access pattern feature 302 and the resource scope 310, and no anomaly suspected when evaluating the combination of the access pattern feature 303 and the resource scope 310. Cube 420 shows a point 421 at position (1, 3, 2) representing that there was a slight anomaly suspected when evaluating the combination of the access pattern feature 301 and the resource scope 320, a likely anomaly suspected when evaluating the combination of the access pattern feature 302 and the resource scope 320, and a moderate anomaly suspected when evaluating the combination of the access pattern feature 303 and the resource scope 320. Cube 430 shows a point 431 at position (0, 0, 0) representing that there really were no anomalies suspected when comparing any of the access pattern features 301 through 303 in the context of the resource scope 330. Cube 440 shows a point 441 at position (0, 2, 4) representing that there were no anomalies suspected when comparing access pattern feature 301 in the context of resource scope 340, a moderate anomaly suspected when comparing access pattern feature 302 in the context of resource scope 440, and a heavily suspected access anomaly when comparing access pattern feature 303 in the context of resource scope 440.

In the embodiment of FIG. 3, anomaly detection was performed using a machine learning model dedicated to each combination of the access pattern features and source scopes. This is advantageous as the complexity of the machine learning model can be kept lower. Furthermore, information can be provided at higher granularity such that the nature of the access anomaly can be quickly seen.

Figure 5:
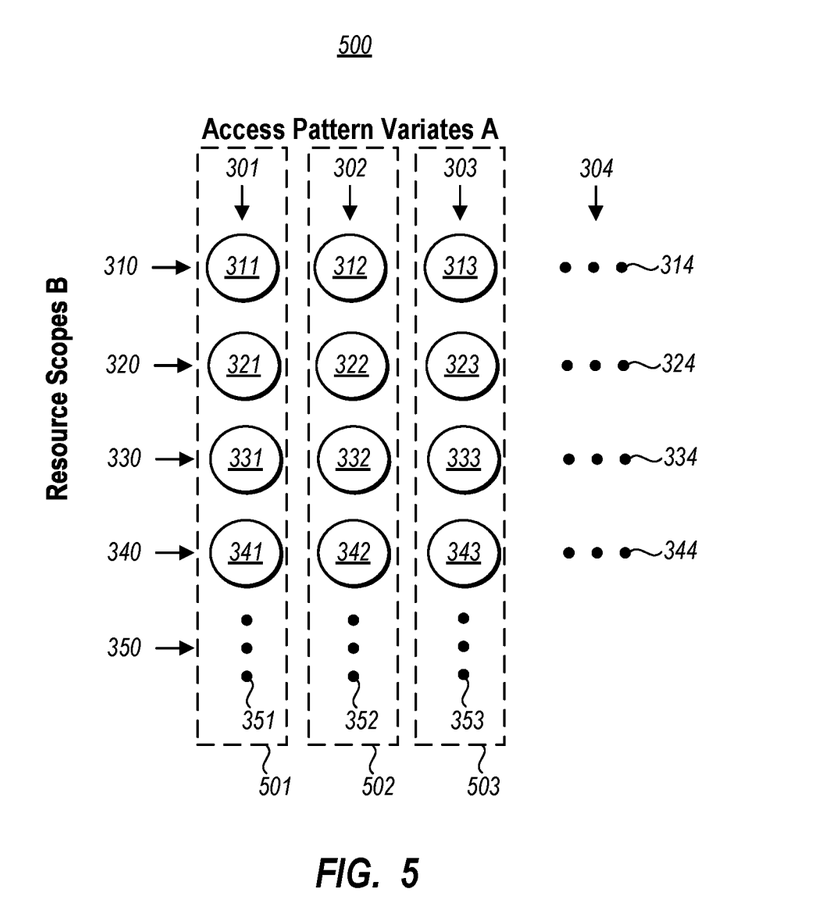
FIG. 5 shows an example grid of access pattern features and resource scopes, which is similar to that of FIG. 3, except with dashed-lined boxes each representing a machine learning model that performs anomaly detection for a respective access pattern feature across resource scopes.

However, in other embodiments, machine learning models may be used so that a single machine learning model may be used for multiple combinations. For example, FIG. 5 shows an example grid 500 of access pattern features and resource scopes, which is similar to that of FIG. 3. However, here, the dashed-lined boxes 501 through 503 are shown, each representing a machine learning model. That is, there is now a machine learning model dedicated to each access pattern feature, but that is applied for all resource scopes.

In particular, a machine learning model 501 could receive the value of the access pattern feature 301 of the access request and the values of all of the resource scopes of the resource requested by the access request, and provide a single anomaly detection for the access pattern feature 301. A machine learning model 502 could receive the value of the access pattern feature 302 of the access request and the values of all of the resource scopes of the resource requested by the access request, and provide a single anomaly detection for the access pattern feature 302. Also, a machine learning model 503 could receive the value of the access pattern feature 303 of the access request and the values of all of the resource scopes of the resource requested by the access request, and provide a single anomaly detection for the access pattern feature 303. This increases the complexity of the machine learning model, but simplifies the reporting of the anomaly detection. This allows for a view of anomalous access by access pattern feature.

Figure 6:
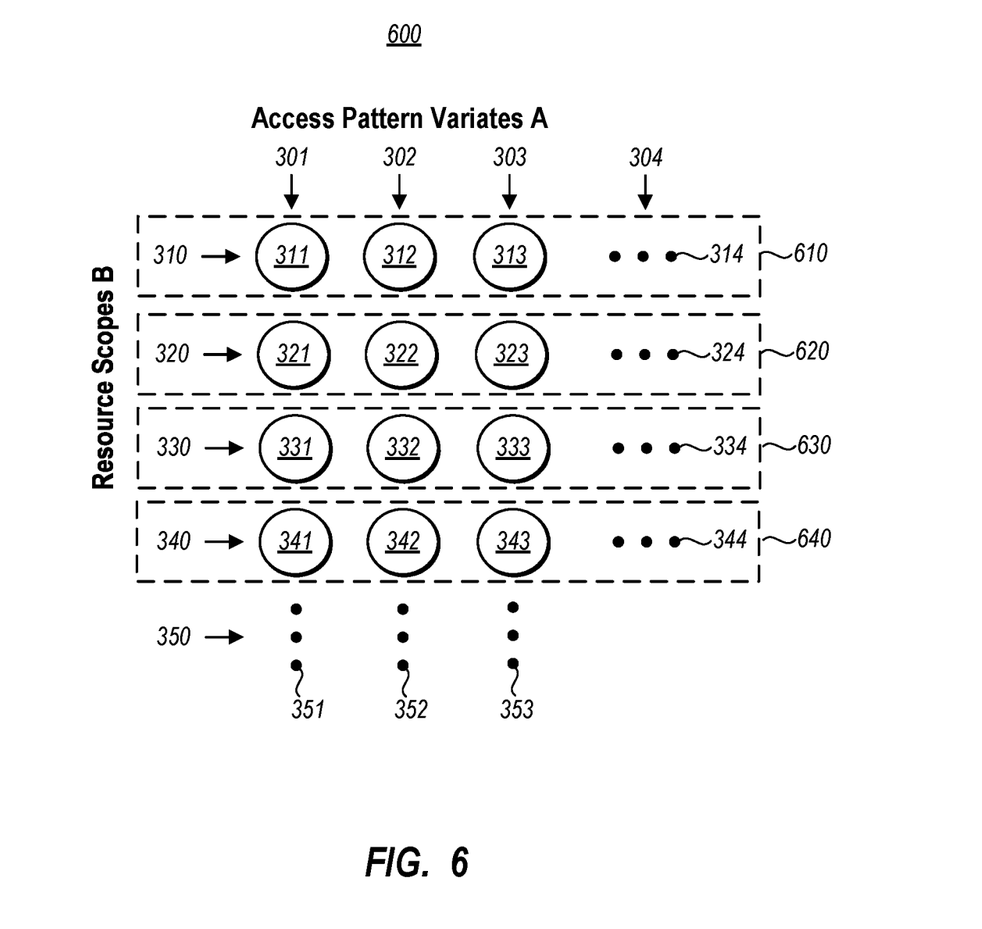
FIG. 6 shows an example grid of access pattern features and resource scopes, which is similar to that of FIG. 3, except with dashed-lined boxes each representing a machine learning model that performs anomaly detection for a respective resource scope across access pattern features.

FIG. 6 shows an example grid 600 of access pattern features and resource scopes, which is similar to that of FIG. 3. However, here, the dashed-lined boxes 610, 620, 630 and 640 each represent a machine learning model dedicated to each access resource scope, but that is applied for all resource access pattern features.

In particular, a machine learning model 610 could receive the values of all access pattern features 301 through 303 of the access request and the value of the resource scope 310 of the resource requested by the access request, and provide a single anomaly detection for the resource scope 310. A machine learning model 620 could receive the values of all access pattern features 301 through 303 of the access request and the value of the resource scope 320 of the resource requested by the access request, and provide a single anomaly detection for the resource scope 320. A machine learning model 630 could receive the values of all access pattern features 301 through 303 of the access request and the value of the resource scope 330 of the resource requested by the access request, and provide a single anomaly detection for the resource scope 330. Also, a machine learning model 640 could receive the values of all access pattern features 301 through 303 of the access request and the value of the resource scope 340 of the resource requested by the access request, and provide a single anomaly detection for the resource scope 340.

In the description above, various embodiments have been described in which there are resource scopes. Those resource scopes may be hierarchical in nature, such that each scope in a lower level of the hierarchy is contained within the scope at upper levels in the hierarchy. In the description above, various embodiments have been described in which a machine learning model is used to perform anomaly detection. These machine learning models could operate as unsupervised models, which is advantageous as there is little labelled data indicating what types of access pattern/resource scopes are malicious or proper. Alternatively, the little labelled data that there is may be used to partially train the machine learning models. In this sense, the machine learning models could be semi-supervised machine learning models.

Accordingly, the principles described herein provide an effective way to perform anomaly detecting using machine learning and at the level of the access pattern feature and resource group. This makes it much easier to reliably detect access problems in complex systems, such as datacenters and cloud computing environments. For instance, in a cloud computing environment, resources are often replicated across different datacenters to enable high availability. An access pattern that focused solely on the location of the resource may then trigger false access pattern alerts since the same user might access a resource in different locations. Similarly, if the user is accessing via a virtual machine or virtual network, it may appear as though the user is impossibly appearing at different geographies, falsely generating an access anomaly alert. Since the principles described herein use more information about the access pattern and resource scope, access anomalies across complex systems may be more accurately detected.

Because the principles described herein are performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
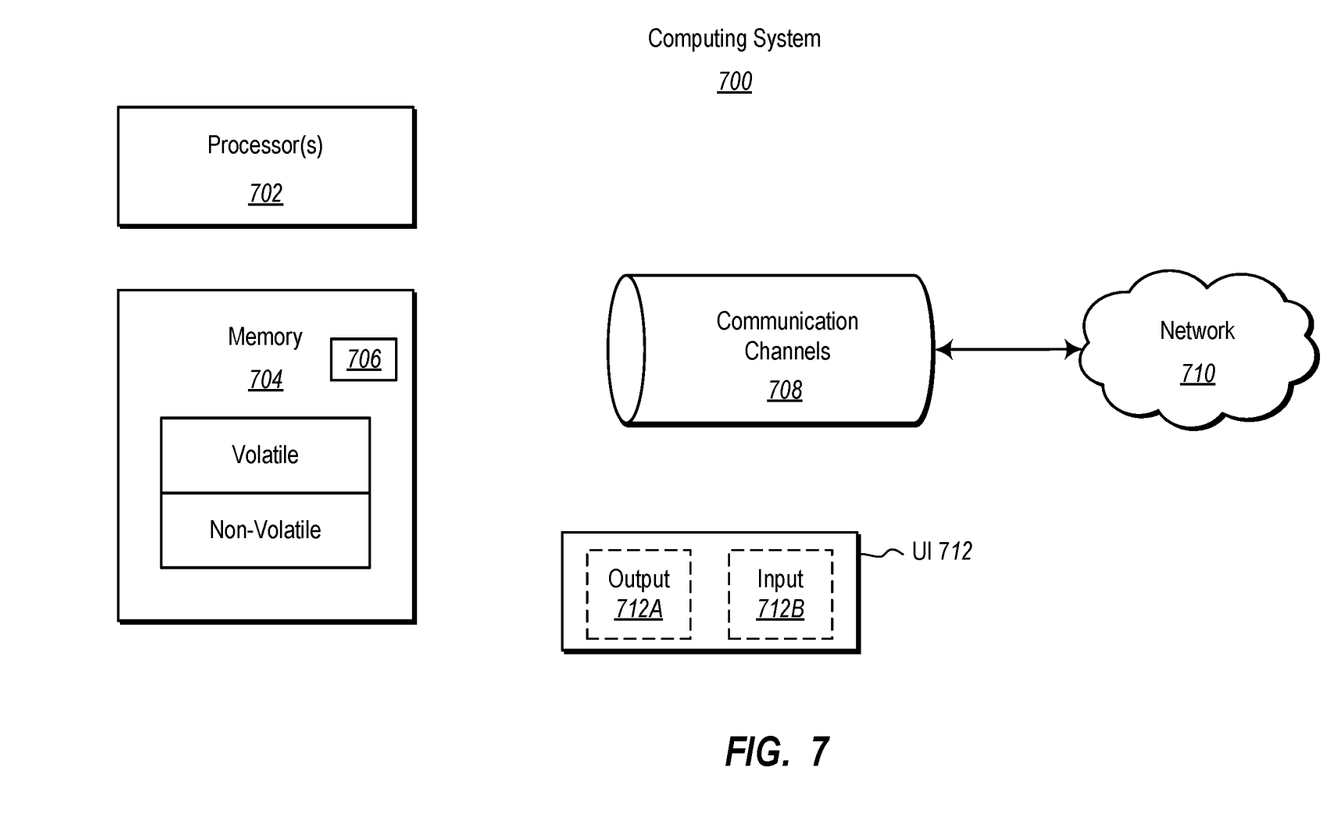
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system.

Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that detects information relevant to a potential access anomaly of an access request, said computing system comprising:
   one or more hardware processors; and
   one or more computer-readable media having thereon computer-executable instructions that are executable by the one or more hardware processors to cause the computing system to:
   detect receipt of an access request;
   identify a plurality of features of an access pattern of the access request;
   identify a plurality of scopes of a resource requested to be accessed by the access request;
   form a grid of combinations by combining each feature from the plurality of features with each scope from the plurality of scopes such that said each feature is included in multiple different combinations, with each of those combinations having a different scope;
   form combination groupings by grouping the combinations in the grid using each feature in the plurality of features as a basis for forming the combination groupings;
   for each combination group in the combination groupings, cause a corresponding machine learning model to be dedicated to said each combination group such that multiple machine learning models are dedicated to the grid of combinations and such that each feature in the plurality of features is associated with a corresponding dedicated machine learning model, wherein the multiple machine learning models are tasked with performing anomaly detection for their respective combination grouping;
   cause the multiple machine learning models to perform anomaly detection on their respective combination groupings; and
   output a result of the anomaly detection.

2. The computing system of claim 1, wherein the access request is structured to conform with a syntactic rule of a query language.

3. The computing system of claim 2, wherein the query language is a structured query language (SQL).

4. The computing system of claim 1, wherein at least one of the plurality of features is a source Internet Protocol address of the access request.

5. The computing system of claim 1, wherein at least one of the plurality of scopes is a hierarchical scope of the resource.

6. The computing system of claim 5, wherein the plurality of scopes include a plurality of the following:
   an individual resource;
   a resource group to which the individual resource belongs;
   a subscription to which the resource group belongs; and
   an organization to which the subscription belongs.

7. The computing system of claim 6, wherein the plurality of features include a plurality of the following:
   a source Internet Protocol address of the access request;
   a geographical location of a source of the access request;
   a username associated with the access request;
   a requesting application associated with the access request; and
   a security credential associated with the access request.

8. The computing system of claim 5, wherein the plurality of features include a plurality of the following:
   a source Internet Protocol address of the access request;
   a geographical location of a source of the access request;
   a username associated with the access request;
   a requesting application associated with the access request; and
   a security credential associated with the access request.

9. The computing system in accordance with claim 1, the anomaly detection performed using an unsupervised machine learning model.

10. The computing system in accordance with claim 1, the anomaly detection performed using a semi-supervised machine learning model.

11. A computer-implemented method for detecting information relevant to a potential access anomaly of an access request, the method comprising:
    detecting receipt of an access request;

identifying a plurality of features of an access pattern of the access request;

identifying a plurality of scopes of a resource requested to be accessed by the access request;

forming a grid of combinations by combining each feature from the plurality of features with each scope from the plurality of scopes such that said each feature is included in multiple different combinations, with each of those combinations having a different scope;

forming combination groupings by grouping the combinations in the grid using each feature in the plurality of features as a basis for forming the combination groupings;

for each combination group in the combination groupings, causing a corresponding machine learning model to be dedicated to said each combination group such that multiple machine learning models are dedicated to the grid of combinations and such that each feature in the plurality of features is associated with a corresponding dedicated machine learning model, wherein the multiple machine learning models are tasked with performing anomaly detection for their respective combination grouping;

causing the multiple machine learning models to perform anomaly detection on their respective combination groupings; and outputting a result of the anomaly detection.

12. The method of claim 11, wherein at least one of the plurality of features includes a geographical location of a source of the access request.

13. The method of claim 11, wherein at least one of the plurality of features includes a username associated with the access request.

14. The method of claim 11, wherein at least one of the plurality of features includes a requesting application associated with the access request.

15. The method of claim 11, wherein at least one of the scopes in the plurality of scopes includes a resource group to which the resource belongs.

16. The method of claim 11, wherein the plurality of scopes include a plurality of the following:
an individual resource;
a resource group to which the individual resource belongs;
a subscription to which the resource group belongs; and
an organization to which the subscription belongs.

17. The method of claim 15, wherein the plurality of features include a plurality of the following:
a source Internet Protocol address of the access request;
a geographical location of a source of the access request;
a username associated with the access request;
a requesting application associated with the access request; and
a security credential associated with the access request.

18. The method in accordance with claim 11, the anomaly detection performed using an unsupervised machine learning model.

19. The method of 11, the anomaly detection performed using a semi-supervised machine learning model.

20. One or more computer-readable hardware storage media having thereon computer-executable instructions that are executable by one or more processors of a computing system to cause the computing system to:

detect receipt of an access request;

identify a plurality of features of an access pattern of the access request;

identify a plurality of scopes of a resource requested to be accessed by the access request;

form a grid of combinations by combining each feature from the plurality of features with each scope from the plurality of scopes such that said each feature is included in multiple different combinations, with each of those combinations having a different scope;

form combination groupings by grouping the combinations in the grid using each feature in the plurality of features as a basis for forming the combination groupings;

for each combination group in the combination groupings, cause a corresponding machine learning model to be dedicated to said each combination group such that multiple machine learning models are dedicated to the grid of combinations and such that each feature in the plurality of features is associated with a corresponding dedicated machine learning model, wherein the multiple machine learning models are tasked with performing anomaly detection for their respective combination grouping;

cause the multiple machine learning models to perform anomaly detection on their respective combination groupings; and output a result of the anomaly detection.

* * * * *